(12) United States Patent
Friederichs et al.

(10) Patent No.: US 9,994,654 B2
(45) Date of Patent: Jun. 12, 2018

(54) CONTINUOUS PROCESS FOR THE PRODUCTION OF ULTRA-HIGH MOLECULAR WEIGHT POLYETHYLENE

(71) Applicant: SABIC GLOBAL TECHNOLOGIES B.V., Bergen op Zoom (NL)

(72) Inventors: Nicolaas Hendrika Friederichs, Geleen (NL); Mark Vlaar, Geleen (NL); Tom Schoffelen, Hulsberg (NL); Matthijs Van Kessel, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days. days.

(21) Appl. No.: 15/512,677

(22) PCT Filed: Sep. 3, 2015

(86) PCT No.: PCT/EP2015/070135
§ 371 (c)(1),
(2) Date: Mar. 20, 2017

(87) PCT Pub. No.: WO2016/045929
PCT Pub. Date: Mar. 31, 2016

(65) Prior Publication Data
US 2017/0283528 A1    Oct. 5, 2017

(30) Foreign Application Priority Data

Sep. 23, 2014 (EP) ..................................... 14185914

(51) Int. Cl.
*C08F 110/02* (2006.01)

(52) U.S. Cl.
CPC .................................. *C08F 110/02* (2013.01)

(58) Field of Classification Search
None
See application file for complete search history.

(56) References Cited

U.S. PATENT DOCUMENTS

| 4,178,300 A | 12/1979 | Van Den Berg |
| 5,019,627 A | 5/1991 | Honma et al. |
| 6,294,682 B1 | 9/2001 | Rauleder et al. |
| 2009/0163679 A1 | 6/2009 | Do Nascimento et al. |

FOREIGN PATENT DOCUMENTS

| CN | 102050893 A | 5/2011 | |
| EP | 0043473 A1 | 1/1982 | |
| EP | 0581611 A2 | 2/1994 | |
| EP | 1713833 B1 | 6/2012 | |
| WO | 0181432 A1 | 11/2001 | |
| WO | 2009112254 A1 | 9/2009 | |
| WO | 2011015553 A1 | 2/2011 | |
| WO | 2011097699 A1 | 8/2011 | |
| WO | 2011144431 A1 | 11/2011 | |
| WO | 2013087167 A2 | 6/2013 | |
| WO | 2013087185 A2 | 6/2013 | |
| WO | WO-2013087185 A2 * | 6/2013 | ............ C08F 110/02 |

OTHER PUBLICATIONS

Berzen et al., "Ultrahigh Molecular Weight Polyethylene (UHMW-PE): Application in Artificial Joints," The British Polymer Journal, vol. 10, Dec. 1978, pp. 281-287.
Dall'Occo et al., "Industrial Aspects of the Production of Catalysts for Ethylene Polymerization," Transition Metals and Organometallics as Catalysts for Olefin Polymerization (Kaminsky, W.; Sinn, H., Eds.) Springer, 1988, pp. 209-222.
International Search Report for International Application No. PCT/EP2015/070135; International Filing Date: Sep. 3, 2015; dated Oct. 15, 2015; 5 Pages.
Kelly, "Ultra-High Molecular Weight Polyethylene," Journal of Macromolecular Science, Part C—Polymer Reviews (2002); vol. C42, No. 3, pp. 355-371.
Machine Translation of CN102050893(A); Date of Publication: May 11, 2011; 6 Pages.
Stein, "Ultra High Molecular Weight Polyethylene (UHMWPE)," Engineered Materials Handbook, vol. 2: Engineering Plastics, ASM International 1999 p. 167-171.
Written Opinion of the International Searching Authority for International Application No. PCT/EP2015/070135; International Filing Date: Sep. 3, 2015; dated Oct. 15, 2015; 5 Pages.

* cited by examiner

*Primary Examiner* — Catherine S Branch
(74) *Attorney, Agent, or Firm* — Cantor Colburn LLP

(57) ABSTRACT

The invention relates to a continuous process for the production of ultra-high molecular weight polyethylene with an Elongational Stress of at least 0.43 N/mm$^2$. The polymerization of ethylene takes place in the presence of a catalyst and hydrogen. It is an advantage of the process according to the invention that the use of small amounts of hydrogen during the production of UHMWPE reduces reactor fouling. Furthermore, the process according to the invention results in longer run times in polymerization reactors, less cleaning cycles to remove reactor fouling and in less need for other anti-fouling agents or anti-static agents.

9 Claims, No Drawings

CONTINUOUS PROCESS FOR THE PRODUCTION OF ULTRA-HIGH MOLECULAR WEIGHT POLYETHYLENE

CROSS REFERENCE TO RELATED APPLICATIONS

This application is a 371 of International Application No. PCT/EP2015/070135, filed Sep. 3, 2015, which claims priority to European Application No. 14185914.0, filed Sep. 23, 2014 which are incorporated herein by reference in their entirety.

The present invention relates to a continuous process for the production of ultra-high molecular weight polyethylene.

The catalytic production of polyethylene is known in the art. A very special class of polyethylene is ultra-high molecular weight polyethylene (UHMWPE) with a very high average molecular weight ranging from about 1000000 to well above 6000000 grams/mole whereas high-density polyethylene (HDPE) typically has a molar mass between about 50000 and 300000 g/mol. Therefore, these linear polymers have an average molecular weight much higher than that of linear high-density polyethylene. The polymer synthesis to obtain UHMWPE is disclosed in Journal of Macromolecular Science Part C Polymer Reviews, Vol. C42, No 3, pp 355-371, 2002. The higher molecular weight gives UHMWPE the unique combination of characteristics making it suitable for applications where lower molecular weight grades fail. The very high molecular weight of this polyethylene results in excellent properties for example a very high abrasion resistance, a very high impact resistance, a very high melt viscosity and a low dynamic coefficient of friction. Because of the high molecular weight and the high melt viscosity specialized processing methods like compression moulding and ram extrusion are applied. Due to the high molecular weight, UHMWPE displays a bad flowability when molten, it is difficult to mould it into a pellet form and the product has to be delivered in a powder form and even more important, it has to be processed from powder. Consequently, the powder properties heavily determine the production process as well as the converting process. For example, this powder has to be stored and to be transported, and consequently the bulk density of the UHMWPE powder is very important. A higher bulk density may decrease clogging at its transportation and it is possible to increase a storable amount per unit volume. By increasing the bulk density, the weight of the UHMWPE per unit volume present in a polymerization vessel can be increased and the concentration of the ultrahigh-molecular-weight polyethylene powder in the polymerization vessel can be enhanced. Similarly, in the processing of UHMWPE a high bulk density also is required. As mentioned, typical processing procedures are ram extrusion and compression moulding. Both methods in principle involve sintering of the powder particles. See for example: H. L. Stein in Engineered Materials Handbook, Volume 2: Engineering Plastics, ASM International 1999 page 167-171. In order for this sintering to become effective, it is very important that a dense polymer powder packing is achieved, which translates into a high bulk density. The bulk density of UHMWPE should be above 300 kg/m$^3$. Also the average particle size of the UHMWPE powder is an important characteristic. The average particle size ($D_{50}$) is preferably lower than 250 micrometers, more preferably below 200 micrometers. In addition, the particle size distribution, commonly known as the "span", defined as $(D_{90}-D_{10})/D_{50}$, should be low, preferably below 2.

It is well known that the shape of the polymer powder particles is translated from the shape of the catalyst particles, also known as the replica phenomenon. In general, when this replication takes place, the average particle size of the polymer is proportional to the cube root of the catalyst yield, i.e. the grams of polymer produced per gram of catalyst. See for example Dall'Occo et al, in "Transition Metals and Organometallics as Catalysts for Olefin Polymerization" (Kaminsky, W.; Sinn, H., Eds.) Springer, 1988, page 209-222. Due to this proportionality, one could produce small polymer particles by reducing the catalyst yield, but this causes high catalyst residues in the polymer and also high catalyst costs needed to produce the polymer. This puts severe requirements on the catalyst because a high catalyst activity is required combined with a polymer particle size below 250 μm, preferably below 200 μm.

Polymers that are not of ultra-high molecular weight, techniques such as chromatographic techniques, like Size Exclusion Chromatography, can be used to determine the weight average and number average molecular weights. However, in the case of UHMWPE, this chromatographic technique cannot be used due to the very high molecular weight. Instead, ultra high molecular weights are generally determined using a viscosimetric procedure where the viscosity number relates to the molecular weight, i.e. not a number averaged or a weight-averaged molecular weight. Alternatively, melt viscosity measurements can be applied, like for example the so-called Elongational Stress measurement. (sometimes also referred to as "Fliesswert" or "Flow value"). The so-called Elongational Stress can be determined according to DIN 53493. A correlation between Elongational Stress and molecular weight is given by Berzen et al in the British polymer Journal, volume 10, December 1978, pp 281-287. Typical values for Elongational Stress for commercial UHMWPE grades are in the range between 0.1 and 0.7 N/mm$^2$. The process to produce UHMWPE must fulfil several requirements and the process should also provide as less as possible agglomeration and deposition in the reactor.

The processes for the production of UHMWPE have as a disadvantage the presence of reactor fouling, sometimes also referred to as sheeting or lumb formation. Therefore, so called anti-fouling agents, which are essentially antistatic agents, for example $C_{12}$-$C_{22}$ fatty acid soaps of sulphonic esters or esters of polyethylene glycols with fatty acids are used to reduce reactor fouling. However, as described for example in EP-A-1713833, there remains a need for preventing fouling, especially in UHMWPE production processes.

It is the object of the present invention to provide a process for the reduction of reactor fouling in UHMWPE production and to obtain UHMWPE with required properties.

The invention is characterised in that the polymerisation of ethylene takes place in the presence of hydrogen and a Ziegler Natta catalyst system comprising I. the solid reaction product obtained by reaction of:
(a) a hydrocarbon solution comprising
  (1) an organic oxygen containing magnesium and
  (2) an organic oxygen containing titanium compound and
(b) a mixture comprising a metal compound having the formula MeR$_n$X$_{3-n}$ in which X is a halogenide, Me is a metal of Group III of Mendeleev's Periodic System of Chemical Elements, R is a hydrocarbon radical containing 1-10 carbon atoms and 0≤n≤3 and a silicon compound of formula R$_m$SiCl$_{4-m}$ wherein 0≤m≤2 and R is a hydrocarbon radical containing 1-10 carbon atoms wherein the molar ratio of metal from (b):titanium from (a) is lower than 1:1, II. an organo aluminium compound having the formula $AlR_3$ in which R is a hydrocarbon radical containing 1-10 carbon atoms and III. an electron donor selected from the group of 1,2-dialkoxy hydrocarbon compounds wherein the polymerisation takes place via a slurry process and wherein the hydrogen to ethylene ratio in the liquid phase of the slurry polymerisation is at least 0.1 mmol hydrogen/mol ethylene.

The process according to the invention results in ultra-high molecular weight polyethylene with an Elongational Stress of at least 0.43 $N/mm^2$ without significant reactor fouling (the Elongational Stress is determined according to DIN 53493).

The polymerization reaction may also be performed in the gas phase or in bulk in the absence of an organic solvent but the preferred polymerisation is carried out in liquid slurry in the presence of an organic diluent.

More preferably, the hydrogen to ethylene ratio in the liquid phase is at least 0.2 mmol hydrogen/mol ethylene.

The hydrogen to ethylene ratio in the liquid phase is less than 2.0 mmol hydrogen/mol ethylene.

In case of a slurry polymerisation in a completely liquid filled reactor, the person skilled in the art can convert the aforementioned composition of the liquid phase to the corresponding values in the head space.

It is an advantage of the continuous process according to the invention that the use of an amount of hydrogen of at least 0.1 mmol hydrogen/mol ethylene in the liquid phase during the liquid slurry production of UHMWPE substantially eliminates reactor fouling.

The presence of the electron donor results in a significant increase in the Elongational Stress value. Lowering the Elongation Stress value can be done for example by increasing the polymerisation temperature which would be preferred from an economical point of view because in this case less cooling is required.

The donor may be used as an internal electron donor, meaning that the donor is present as a component in the solid catalyst, or as an external electron donor, meaning that the donor is added as a separate component during the polymerisation.

Preferably, the electron donor compound is added as an external electron donor compound In case the polymerisation is carried out in liquid slurry, this can be carried out in a completely liquid filled reactor or in a gas-liquid reactor. In case the polymerisation is carried out in a liquid slurry using a gas-liquid reactor, the composition of the gas above the liquid phase, sometimes referred to as headspace, can be measured using established techniques for example on-line gas-chromatography to monitor and control the amount of monomer and/or hydrogen.

The combination of the specific catalyst, the specific amount of hydrogen and the specific donor results in the improvements as described in this invention.

Furthermore, the process according to the invention results in longer run times in polymerization reactors, less cleaning cycles to remove reactor fouling and less need for the use of other anti-fouling agents or anti-static agents.

The polymerization temperature may range from 20° C. to 100° C., and ranges preferably from 50° C. to 90° C.

The hydrogen can be added at several stages during the polymerisation. For instance in a batch process, hydrogen may be added before the polymerisation starts or during the polymerisation. In a continuous process hydrogen may be added for example together with the monomer and/or diluent streams.

The hydrocarbon solution I(a)(1) is a hydrocarbon solution comprising an organic oxygen containing magnesium compound. Suitable organic oxygen containing magnesium compounds include for example alkoxides such as magnesium methylate, magnesium ethylate and magnesium isopropylate and alkylalkoxides such as magnesium ethylethylate.

Generally the organic oxygen containing magnesium compound is a magnesium alkoxide.

The magnesium alkoxide may be magnesium ethoxide.

The hydrocarbon solution I(a)(2) is a hydrocarbon solution comprising an organic oxygen containing titanium compound. Suitable organic oxygen containing titanium compounds may be represented by the general formula $[TiO_x(OR)_{4-2x}]n$ in which R represents an organic radical, x ranges between 0 and 1 and n ranges between 1 and 6.

Suitable examples of organic oxygen containing titanium compounds include alkoxides, phenoxides, oxyalkoxides, condensed alkoxides, carboxylates and enolates.

Generally the organic oxygen containing titanium compounds are titanium alkoxides.

Suitable alkoxides include for example $Ti(OC_2H_5)_4$, $Ti(OC_3H_7)_4$, $Ti(OC_4H_9)_4$, and $Ti(OC_8H_{17})_4$.

The titanium alkoxide may be $Ti(OC_4H_9)_4$.

The components of the mixture I(b) are used as a mixture in the reaction with the hydrocarbon solution I(a) instead of being used separately or sequentially.

Preferred metals in the metal compound having the formula $MeR_nX_{3-n}$ of Group III of Mendeleev's Periodic System of Chemical Elements in I(b) are aluminium and boron. Preferably the halogenide X is Cl.

More preferably, the metal compound from I(b) having the formula $MeR_nX_{3-n}$ is an aluminium compound having the formula $AlR_nX_{3-n}$ in which X is a halogen and R is a hydrocarbon radical containing 1-10 carbon atoms and $0 \le n \le 3$.

Generally the metal compound from I(b) having the formula $MeR_nX_{3-n}$ is an aluminium compound having the formula $AlR_nCl_{3-n}$.

Generally, the molar ratio of aluminium from I(b):titanium from I(a) is lower than 1:1.

A preferred electron donor (III) is a dialkoxy hydrocarbon compound represented by the formula (I):

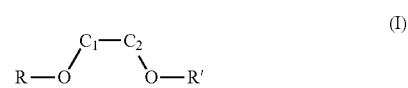
(I)

wherein $C_1$-$C_2$ is a connecting group consisting of 2 carbon atoms which are in the $sp^3$ and/or $sp^2$ hybridisation form and wherein the substituent's R and R' are hydrocarbon groups with 1-10 carbon atoms and may be the same or different and may optionally be substituted with other groups containing O, N, or Si.

Examples of hydrocarbon groups include alkyl groups, alkenyl groups, cycloalkyl groups, cycloalkenyl groups, aryl groups or aralkyl groups.

The meaning of $sp^3$ and/or $sp^2$ hybridisation is known to the man skilled in the art and for example described by Henry Bent in Chem. Review, 1961 (3) pages 275-311.

The electron donor may be selected from the group of 1,2-dialkoxyalkanes, 1,2-dialkoxyalkenes and alkoxybenzenes.

According to a preferred embodiment of the invention the donor is selected from the group including 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane.

According to a further preferred embodiment of the invention the electron donor is selected from the group of 1-allyl-3,4-dimethoxybenzene and 1,2-dimethoxybenzene.

According to a further preferred embodiment of the invention a post treatment is performed. The post treatment of the solid reaction product with an aluminium alkyl compound further increases the catalyst productivity.

According this further preferred embodiment the catalyst system comprises:

I. the solid reaction product obtained by reaction of:
(a) a hydrocarbon solution comprising
  (1) an organic oxygen containing magnesium compound and
  (2) an organic oxygen containing titanium compound
(b) a mixture comprising a metal compound having the formula $MeR_nX_{3-n}$ wherein X is a halogen and R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b):titanium from (a) is lower than 1:1
and
(c) post treatment of the obtained solid reaction product with an aluminium compound having the formula $AlR_nCl_{3-n}$ wherein R is a hydrocarbon radical containing 1-10 carbon atoms and $0 \leq n \leq 3$ and combining the reaction product from (I) with II. an organo aluminium compound having the formula $AlR_3$ in which R is a hydrocarbon radical containing 1-10 carbon atoms and III. an electron donor selected from the group of 1,2-dialkoxy hydrocarbon compounds.

Suitable examples of aluminium compounds from I(c) having the formula $AlR_nX_{3-n}$ include aluminium tri chloride, ethyl aluminium dibromide, ethyl aluminium dichloride, propyl aluminium dichloride, n-butyl aluminium dichloride, isobutyl aluminium dichloride, diethyl aluminium chloride, diisobutyl aluminium chloride, triisobutyl aluminium and tri-n-hexyl aluminium.

Generally, the metal compound having the formula $AlR_nX_{3-n}$ is an organo aluminium halogenide having the formula $AlR_nCl_{3-n}$ n such as ethyl aluminium dichloride.

Suitable examples of organo aluminum compounds of the formula $AlR_3$ from II include for example triethyl aluminium, triisobutyl aluminium, tri-n-hexyl aluminium and tri octyl aluminium.

The hydrocarbon solution of organic oxygen containing magnesium compound and organic oxygen containing titanium compound can be prepared according to procedures as disclosed for example in U.S. Pat. No. 4,178,300 and EP-A-876318. The solutions are in general clear liquids. In case there are any solid particles, these can be removed via filtration prior to the use of the solution in the catalyst synthesis.

The amount of aluminum compound in I(b) should be low, typically below a molar ratio of aluminum from (b) to titanium from (a) of less than 1.

Generally the molar ratio of aluminium from I(b):titanium from I(a) is lower than 1:1.

Generally the molar ratio of chlorine from $R_mSiCl_{4-m}$:oxygen as present in the hydrocarbon solution I(a) is lower than 3:1.

Generally the molar ratio of magnesium:titanium is lower than 3:1 and ranges for example between 0.2:1 and 3:1.

Generally the molar ratio Al from the aluminium compound in I (b+c):Ti ranges between 0.05:1 and 1:1.

Generally the molar ratio Al from the aluminium compound in I (b+c):Ti ranges between 0.05:1 and 0.8:1.

Generally, the average particle size of the catalyst ranges between 1 µm and 30 µm. Preferably, the average particle size ranges between 2 µm and 10 µm.

Generally the span of the particle size distribution is lower than 3, preferably lower than 2 and more preferably below 1.5.

The catalyst may be obtained by a first reaction between an organic oxygen containing magnesium compound and an organic oxygen containing titanium compound, followed by dilution with a hydrocarbon solvent, resulting in a soluble complex consisting of a magnesium alkoxide and a titanium alkoxide and thereafter a reaction between a hydrocarbon solution of said complex and the mixture comprising the metal compound having the formula $MeR_nX_{3-n}$ and the silicon compound of formula $R_mSiCl_{4-m}$.

The catalyst may be obtained by a first reaction between magnesium alkoxide and titanium alkoxide, followed by dilution with a hydrocarbon solvent, resulting in a soluble complex consisting of a magnesium alkoxide and titanium alkoxide. Thereafter a second reaction is performed between a hydrocarbon solution of said complex and the mixture comprising the aluminium compound having the formula $AlR_nX_{3-n}$ and the silicon compound of formula $R_mSiCl_{4-m}$.

The mixture comprising the aluminium compound having the formula $AlR_nX_{3-n}$ and the silicon compound of formula $R_mSiCl_{4-m}$ may be used as a solution in a hydrocarbon.

A subsequent post treatment step in the presence of an aluminium compound as described in the foregoing is possible.

The sequence of the addition can be either adding the hydrocarbon solution containing the organic oxygen containing magnesium compound and organic oxygen containing titanium compound to the mixture comprising the aluminium compound having the formula $AlR_nX_{3-n}$ and the silicon compound of formula $R_mSiCl_{4-m}$ or the reversed.

The hydrocarbon solution containing the organic oxygen containing magnesium compound and organic oxygen containing titanium compound may be dosed to a stirred hydrocarbon solution comprising the aluminium compound having the formula $AlR_nX_{3-n}$ and the silicon compound of formula $R_mSiCl_{4-m}$.

The temperature for this reaction can be any temperature below the boiling point of the used hydrocarbon. It is however beneficial to use temperatures below 60° C., preferably below 50° C. Generally the duration of the addition is preferably longer than 10 minutes and preferably longer than 30 minutes.

In the reaction of the hydrocarbon solution comprising the organic oxygen containing magnesium compound, and an organic oxygen containing titanium compound with the mixture of the halogen containing silicon compound and the aluminium compound, a solid precipitates and after the precipitation reaction the resulting mixture is heated to finish the reaction. After the reaction the precipitate is filtered and washed with a hydrocarbon. Other means of separation of the solids from the diluent and subsequent washings can also be applied, like for example multiple decantation steps. All steps should be performed in an inert atmosphere of nitrogen or another suitable inert gas. The post treatment with an aluminium compound can be performed either before the filtration and washing steps or after this procedure.

The polymerization reaction may be performed in the gas phase or in bulk in the absence of an organic solvent, or carried out in liquid slurry in the presence of an organic diluent. These slurry processes can be either 2 phase processes, containing solid polymer particles in a liquid diluent or 3 phase processes containing the solid polymer particles in a liquid diluent and a gas phase, containing essentially gaseous diluent, ethylene, nitrogen and hydrogen.

The reaction is performed in the absence of oxygen, water, or any other compounds that may act as a catalyst poison. Suitable solvents include for example alkanes and cycloalkanes such as for example propane, isobutane, pentane, hexane, heptane, n-octane, iso-octane, cyclohexane, and methylcyclohexane and alkylaromatics such as for example toluene, xylene, ethylbenzene, isopropylbenzene, ethyltoluene, n-propylbenzene and diethylbenzene.

According to a preferred embodiment of the invention the polymerization temperature ranges between 20 and 100° C.

The pressure in the reactor during polymerization is adequately the atmospheric pressure and more preferably between 2 and 60 bars. (1 bar=100000 Pa).

The polymerization can be carried out in the presence of an anti-static agent or anti fouling agent in an amount ranging between for example 1 and 500 ppm related to the total amount of reactor contents.

The ultra-high molecular weight ethylene homo polymer and/or co polymer obtained with the process according to the invention is a powder having the following characteristics:

Elongational Stress of at least 0.43 N/mm$^2$ (Elongational Stress determined according to DIN 53493).

average particle size ($D_{50}$) in the range between 20 and 250 micrometers and poured bulk density in the range between 350 and 600 kg/m$^3$ The poured bulk density of the ultrahigh-molecular-weight polyethylene polymer powder of the invention is determined by measuring the bulk density of the polymer powder according to the procedure outlined in ASTM D1895/A.

WO2011097699 discloses a process to reduce fouling in an olefin polymerization reactor having an internal steel surface comprising less than 10 weight % Mo, comprising prior to polymerization subjecting the internal steel surface to reduction by exposure to a gas comprising not less than 50 volume % hydrogen at a temperature greater than 185 degrees Celsius for a time from 15 minutes to 30 hours, with shorter times at higher temperatures. WO2011097699 teaches to treat the internal surface of the reactor at a temperature higher than 185 degrees Celsius with a reducing gas before the polymerisation takes place. The gas may be a mixture comprising not less than 50 volume % hydrogen, helium, nitrogen and argon.

In the process according to the present invention there is no need to carry out an elaborate pretreatment of the reactor.

WO2009112254 discloses that hydrogen can be used to reduce the molecular weight of the polymer obtained during olefin polymerisations. However, in order to make ultra-high molecular weight of the UHMWPE with an Elongational Stress value of at least 0.43 N/mm$^2$, the conventional state-of-the-art processes to produce UHMwPE, for example as published in EP581611 and WO 0181432, are substantially free of hydrogen and therefore more prone to reactor fouling.

EP43473 and WO2011015553 disclose the presence of hydrogen during the polymerisation of ethylene. Regarding the values of the melt flow index, EP43473 and WO2011015553 do not relate to UHMWPE because melt flow indexes cannot be determined for UHMWPE.

WO2013087167 is directed to the production of bimodal HDPE with a different catalyst. Regarding the values of the melt flow index WO2013087167 does not relate to UHMWPE because melt flow indexes cannot be determined for UHMWPE.

WO2013087185 teaches to apply a batch process for the production of UHMWPE. The examples disclose a polymerisation process of ethylene which is stopped after 150 minutes without the use of hydrogen.

UHMWPE can be applied in articles in very different areas where excellent impact strength and abrasive wear resistance are required. In medical applications UHMWPE is used in knee, shoulder and hip implants, high strength fibres made from UHMWPE can be found in ballistic cloth, fishing lines and nets and in the mining industry. UHMWPE may be used as hopper or bunker liners.

UHMWPE obtained with the process according to the present invention can also be applied for example in the production of rods, tubes, bars, and more intricate continuous profiles by ram extrusion and large sheets by compression moulding.

The invention will be elucidated by means of the following non-restrictive examples.

EXAMPLES

Experiment I

Preparation of the Magnesiumethylate-Titaniumbutylate Complex in Hexanes.

A 20 wt % magnesiumethylate-titaniumbutylate complex (MGT) in hexanes was prepared according to the procedure as disclosed in WO2013087185/Experiment I.

Experiment II

Preparation of the Catalyst 4 liter of purified hexanes, 173 ml SiCl$_4$ (1.51 mol) and 35 ml 50% ethyl-aluminum dichloride in hexanes (0.119 mol of aluminum) are added to a 10 L glass reactor equipped with baffles, external heating and stirrer. Subsequently 2 L of the 20 wt % solution of a MGT complex (0.5 mol) was added to the reactor in 4 hours' time by using a dosing rate of 500 ml/hour, while stirring the reactor contents at a speed of 1300 rpm. After the MGT solution was added, the resulting suspension was heated to reflux temperature for 2 hours while maintaining the stirring speed at 1300 rpm. Next, the resulting suspension was cooled down to 50° C. after which the solid catalyst was washed using a decanting procedure. The solid particles were allowed to settle down, the top layer of hexanes was removed and replaced by fresh hexanes. These steps are performed 3 times with 3 L of fresh hexanes. Afterwards, the concentrated suspension was transferred to a 2 L flask and extra washing was applied using the decanting procedure. The solids were washed in total 13 times with 1500 ml of fresh hexanes. After that, the approximately 200 grams of solid pre-catalyst was stored as a slurry in hexanes in a 2 L flask under nitrogen atmosphere. The average particle size of the catalyst, as measured using laser light scattering was 3.7 microns.

Example I

Polymerization Process

Ethylene was polymerized in a continuously operated 20 L gas-liquid CSTR reactor in hexanes in the presence of the catalyst system as prepared according to Experiment II, Triisobutylaluminium (TiBA) was used as a co-catalyst. The antifouling agent STATSAFE 6000 (AFA) was used to reduce reactor fouling.

Hexanes (2.947 kg/h), ethylene (1.053 kg/h) and hydrogen (0.010 g/h) were continuously fed to the reactor at 75.0° C. TiBA, AFA and external donor (1.2 dimethoxy benzene) were also continuously fed to the reactor in such an amount that concentration of aluminium in the hexanes was 40 ppm, the concentration of AFA was 40 ppm and the concentration of donor was $3.396*10^{-5}$ mol/l. The polyethylene production was 0.98 kg/h.

The hydrogen to ethylene ratio in the headspace of the reactor, as measured by online gas chromatography was 3 mmol of hydrogen per mol of ethylene. The hydrogen to ethylene ratio in the liquid phase of the slurry polymerisation was 0.19 mmol hydrogen/mol ethylene.

The catalyst productivity was 25200 g of polyethylene per g of catalyst.

During polymerization no decrease of heat transfer over the reactor wall was observed, which can be used as an indicator the absence of reactor fouling. After a run time of 48 hours the polymerization was stopped. After opening the reactor no reactor fouling or sheeting was observed.

The obtained polymer had the following characteristics:
Elongational Stress: 0.46 N/mm$^2$
D50 polymer: 146 micrometers
Poured bulk density: 474 kg/m$^3$

Experiment III

Preparation of the Catalyst

A catalyst was prepared according to the procedure according to Experiment II, while using a stirrer rate of 800 RPM instead of 1200 RPM. In this case, the average particle size of the catalyst, as measured using laser light scattering was 4.8 micrometers.

Comparative Example A

Polymerization

Ethylene was polymerized in a continuously operated 20 L gas-liquid CSTR reactor in hexanes in the presence of the catalyst system prepared according to Experiment III Triisobutylaluminium (TiBA) was used as a co-catalyst. The antifouling agent STATSAFE 6000 (AFA) was used to reduce reactor fouling.

Hexanes (2.947 kg/h), ethylene (1.053 kg/h) and hydrogen (0.006 g/h) were continuously fed to the reactor at 75.0° C. TiBA and AFA were also continuously fed to the reactor in such an amount that concentration of aluminium in the hexanes was 40 ppm and the concentration of AFA was 40 ppm.

Polyethylene production was 1.03 kg/h.

The hydrogen to ethylene ratio in the headspace of the reactor, as measured by online gas chromatography was 9.7 mmol of hydrogen per mol of ethylene.

The catalyst productivity was 16500 g of polyethylene per g of catalyst.

Elongational Stress: 0.17 N/mm$^2$ determined according to DIN 53493.
D50 polymer: 160 micrometers
Poured bulk density: 440 kg/m$^3$ During a polymerization time of 44 hours, there were no indications of reactor fouling or sheeting, as indicated for instance by the constant heat transfer over the reactor wall, which can be used as an indicator the absence of reactor fouling.

In this comparative example without use of an electron donor, the Elongational Stress value was below 0.43 N/mm$^2$.

Comparative Example B

After a run time of 44 hours as described in Comparative Example A, without any indication of reactor fouling, the hydrogen dosing to the reactor was stopped. Within 8 hours after stopping the hydrogen dosing, the polymerization had to be stopped because of blocked reactor discharge lines. After opening the reactor severe reactor fouling was observed.

Elongational Stress: 0.40 N/mm$^2$ determined according to DIN 53493
D50 polymer: 179 micrometers
Poured bulk density: 430 kg/m$^3$ Comparative Example B illustrates that without hydrogen, the highest obtainable Elongational Stress was 0.40 N/mm$^2$. Furthermore severe reactor fouling was observed.

The examples illustrate that the addition of a small amount of hydrogen substantially eliminates reactor fouling and provides a more stable process for the production of UHMWPE without the need of reactor stops to clean the reactor.

The Elongational Stress is also reduced when hydrogen is added to the reactor, which prevents easy access to UHMWPE with an Elongational Stress value higher than 0.40 N/mm$^2$.

When hydrogen is added to the reactor in combination with a donor the reactor fouling is also substantially reduced without reducing the Elongational Stress, thereby allowing easy access to UHMWPE with an Elongational Stress above 0.4 N/mm$^2$.

The invention claimed is:

1. A continuous process for the production of ultra-high molecular weight polyethylene with an Elongational Stress of at least 0.43 N/mm$^2$ (determined according to DIN 53493) wherein the polymerisation of ethylene takes place in the presence of hydrogen and a Ziegler Natta catalyst comprising:
   I. the solid reaction product obtained by reaction of:
      (a) a hydrocarbon solution comprising
         (1) an organic oxygen containing magnesium compound and
         (2) an organic oxygen containing titanium compound and
      (b) a mixture comprising a metal compound having the formula MeR$_n$X$_{3-n}$ wherein X is a halogenide, Me is a metal of Group III of Mendeleev's Periodic System of Chemical Elements, R is a hydrocarbon radical containing 1-10 carbon atoms and 0≤n≤3 and a silicon compound of formula R$_m$SiCl$_{4-m}$ wherein 0≤m≤2 and R is a hydrocarbon radical containing 1-10 carbon atoms wherein the molar ratio of metal from (b):titanium from (a) is lower than 1:1,
   II. an organo aluminium compound having the formula AlR$_3$ in which R is a hydrocarbon radical containing 1-10 carbon atoms and III. an electron donor selected from the group of 1,2-dialkoxy hydrocarbon compounds,
wherein the polymerisation takes place via a slurry process and wherein the hydrogen to ethylene ratio in the liquid phase of the slurry polymerisation is at least 0.1 mmol hydrogen/mol ethylene and less than 2.0 mmol hydrogen/mol ethylene.

2. A process according to claim 1 characterised in that the catalyst comprises
 I. the solid reaction product obtained by reaction of:
  (a) a hydrocarbon solution comprising
   (1) an organic oxygen containing magnesium compound and
   (2) an organic oxygen containing titanium compound
  (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b):titanium from (a) is lower than 1:1 and
  (c) post treatment of the obtained solid reaction product with an aluminium compound having the formula $AlR_nCl_{3-n}$ wherein R is a hydrocarbon radical containing 1-10 carbon atoms and $0 \leq n \leq 3$ and combining the reaction product from (I) with
 II. an organo aluminium compound having the formula $AlR_3$ in which R is a hydrocarbon radical containing 1-10 carbon atoms and
 III. an electron donor selected from the group of 1,2-dialkoxy hydrocarbon compounds.

3. A process according to claim 1 characterised in that the electron donor is a 1,2-dialkoxy hydrocarbon compound represented by formula (I):

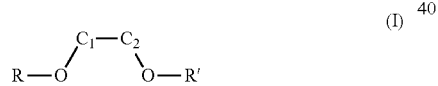

wherein $C_1$-$C_2$ is a connecting group consisting of 2 carbon atoms which are in the sp³ and/or sp² hybridisation form and wherein the substituent's R and R' are hydrocarbon groups with 1-10 carbon atoms and may be the same or different and may optionally be substituted with other groups containing O, N, or Si.

4. A process according to claim 3 characterised in that the electron donor is selected from the group 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane.

5. A process according to claim 4 characterised in that the electron donor is 1-allyl-3,4-dimethoxybenzene or 1,2-dimethoxybenzene.

6. A process according to claim 1 characterised in that the polymerisation temperature ranges from 20° C. to 100° C.

7. Article prepared using the ultra-high molecular weight polyethylene obtained with the process according to claim 1.

8. A continuous process for the production of ultra-high molecular weight polyethylene with an Elongational Stress of at least 0.43 N/mm² (determined according to DIN 53493) wherein the polymerisation of ethylene takes place in the presence of hydrogen and a Ziegler Natta catalyst comprising:
 I. the solid reaction product obtained by reaction of:
  (a) a hydrocarbon solution comprising
   (1) an organic oxygen containing magnesium compound and
   (2) an organic oxygen containing titanium compound and
  (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b):titanium from (a) is lower than 1:1,
  (c) post treatment of the obtained solid reaction product with an aluminium compound having the formula $AlR_nCl_{3-n}$ wherein R is a hydrocarbon radical containing 1-10 carbon atoms and $0 \leq n \leq 3$, and combining the reaction product from (I) with
 II. an organo aluminium compound having the formula $AlR_3$ in which R is a hydrocarbon radical containing 1-10 carbon atoms and
 III. an electron donor selected from the group 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane,
 wherein the polymerisation takes place via a slurry process and wherein the hydrogen to ethylene ratio in the liquid phase of the slurry polymerisation is at least 0.1 mmol hydrogen/mol ethylene and less than 2.0 mmol hydrogen/mol ethylene.

9. A process according to claim 8 characterised in that the electron donor is 1-allyl-3,4-dimethoxybenzene or 1,2-dimethoxybenzene.

* * * * *